US012710934B2

(12) United States Patent
Jaggumantri et al.

(10) Patent No.: US 12,710,934 B2
(45) Date of Patent: Aug. 18, 2026

(54) METHOD AND SYSTEM FOR LEGACY CODE TRANSFORMATION

(71) Applicant: INFOSYS LIMITED, Bangalore (IN)

(72) Inventors: Srinivas Jaggumantri, Bangalore (IN); Madhavi Latha Padakanti, Bangalore (IN); Nareshkumar Manoharan, Bangalore (IN)

(73) Assignee: Infosys Limited, Bangalore (IN)

( * ) Notice: Subject to any disclaimer, the term of this patent is extended or adjusted under 35 U.S.C. 154(b) by 233 days.

(21) Appl. No.: 18/432,236

(22) Filed: Feb. 5, 2024

(65) Prior Publication Data

US 2025/0053389 A1 Feb. 13, 2025

(51) Int. Cl.
*G06F 8/35* (2018.01)
*G06F 8/51* (2018.01)
*G06F 40/20* (2020.01)

(52) U.S. Cl.
CPC .................. *G06F 8/35* (2013.01); *G06F 8/51* (2013.01); *G06F 40/20* (2020.01)

(58) Field of Classification Search
CPC .......................................................... G06F 8/35
See application file for complete search history.

(56) References Cited

U.S. PATENT DOCUMENTS 11,042,369 B1 * 6/2021 Kimball .............. G06F 11/3604
11,354,120 B1 * 6/2022 Zhang ....................... G06F 8/72
11,604,626 B1 * 3/2023 Sawant ..................... G06F 8/75
11,768,831 B2 * 9/2023 Scholak ................ G06F 16/243 707/760
11,797,317 B1 * 10/2023 McLaughlin ............. G06F 8/43
11,861,263 B1 * 1/2024 Hunt ....................... G10L 15/22
12,008,341 B2 * 6/2024 Chen ......................... G06F 8/33

(Continued)

FOREIGN PATENT DOCUMENTS

CN 115795009 A * 3/2023
DE 102024111093 A1 * 10/2025

OTHER PUBLICATIONS

Diggs, Colin, et al. "Leveraging LLMs for Legacy Code Modernization: Evaluation of LLM-Generated Documentation." 2025 IEEE/ACM International Workshop on Large Language Models for Code (LLM4Code). IEEE, 2025.*

*Primary Examiner* — Francisco J Aponte
(74) *Attorney, Agent, or Firm* — Finnegan, Henderson, Farabow, Garrett & Dunner, LLP

(57) ABSTRACT

This disclosure relates to method and system for facilitating legacy code transformation. The method includes receiving legacy code data and natural language document from one or more data sources. Each of the one or more data sources is one of an external data source or an internal data source. Further, the method includes generating a first natural language output based on the legacy code data through a first LLM, and a second natural language output based on the natural language document through a second LLM. Further, the method includes fine-tuning one of the first LLM or the second LLM based on the first natural language output and the second natural language output, through a third LLM. Further, the method includes generating a natural language specification document corresponding to the legacy code data based on the first natural language output and the second natural language output through the third LLM.

19 Claims, 10 Drawing Sheets

(56) References Cited

U.S. PATENT DOCUMENTS

| | | | | |
|---|---|---|---|---|
| 12,169,715 | B2 * | 12/2024 | Fu | G06N 3/084 |
| 12,293,272 | B1 * | 5/2025 | Poulis | G06N 20/00 |
| 12,360,745 | B2 * | 7/2025 | Zhao | G06N 20/00 |
| 12,360,791 | B1 * | 7/2025 | Vadaparty | G06F 8/31 |
| 12,386,613 | B2 * | 8/2025 | Matić | G06F 8/33 |
| 12,450,799 | B1 * | 10/2025 | Duttagupta | G06T 11/206 |
| 12,455,736 | B1 * | 10/2025 | Vadaparty | G06F 8/72 |
| 12,456,071 | B2 * | 10/2025 | Xiao | G06N 5/022 |
| 2019/0228319 | A1 * | 7/2019 | Gupta | G06F 8/75 |
| 2020/0249918 | A1 * | 8/2020 | Svyatkovskiy | G06N 3/084 |
| 2021/0232920 | A1 * | 7/2021 | Parangi | G06N 3/0455 |
| 2022/0164626 | A1 * | 5/2022 | Bird | G06F 8/71 |
| 2023/0305822 | A1 * | 9/2023 | Ferrucci | G06F 8/41 |
| 2024/0111498 | A1 * | 4/2024 | Vaughn | G06F 8/30 |
| 2024/0289606 | A1 * | 8/2024 | Wang | G06N 3/0455 |
| 2024/0329948 | A1 * | 10/2024 | Yuan | G06F 8/4441 |
| 2024/0403792 | A1 * | 12/2024 | Goutal | G06F 40/40 |
| 2024/0411535 | A1 * | 12/2024 | Ken-Kwofie | G06F 8/51 |
| 2024/0419917 | A1 * | 12/2024 | Clement | G06N 3/045 |
| 2025/0013910 | A1 * | 1/2025 | Grigore | G06Q 10/06 |
| 2025/0045185 | A1 * | 2/2025 | Tang | G06F 11/3684 |
| 2025/0094145 | A1 * | 3/2025 | Weber | G06F 8/43 |
| 2025/0251917 | A1 * | 8/2025 | Hensley | G06F 16/31 |
| 2025/0291588 | A1 * | 9/2025 | Muthulingam | G06F 8/76 |
| 2025/0306906 | A1 * | 10/2025 | Chiricescu | G06F 9/451 |

* cited by examiner

FIG. 1
100
User Device 101
Communication Network 103
Computing Device 102

400

Train the first LLM using a training dataset through a self-supervised learning technique 401
at least one of:

Configure the first LLM to generate the code explanation corresponding to the legacy code data in the first natural language output 402

Configure the first LLM to generate the domain context in the first natural language output, wherein the training dataset comprises textual data 403

FIG. 4

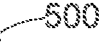

Generate the first natural language output based on the legacy code data 303
at least one of:

Generate expanded code functions corresponding to the legacy code data in natural language 501

Generate summaries of code comments in the legacy code data in natural language 502

Figure 6:
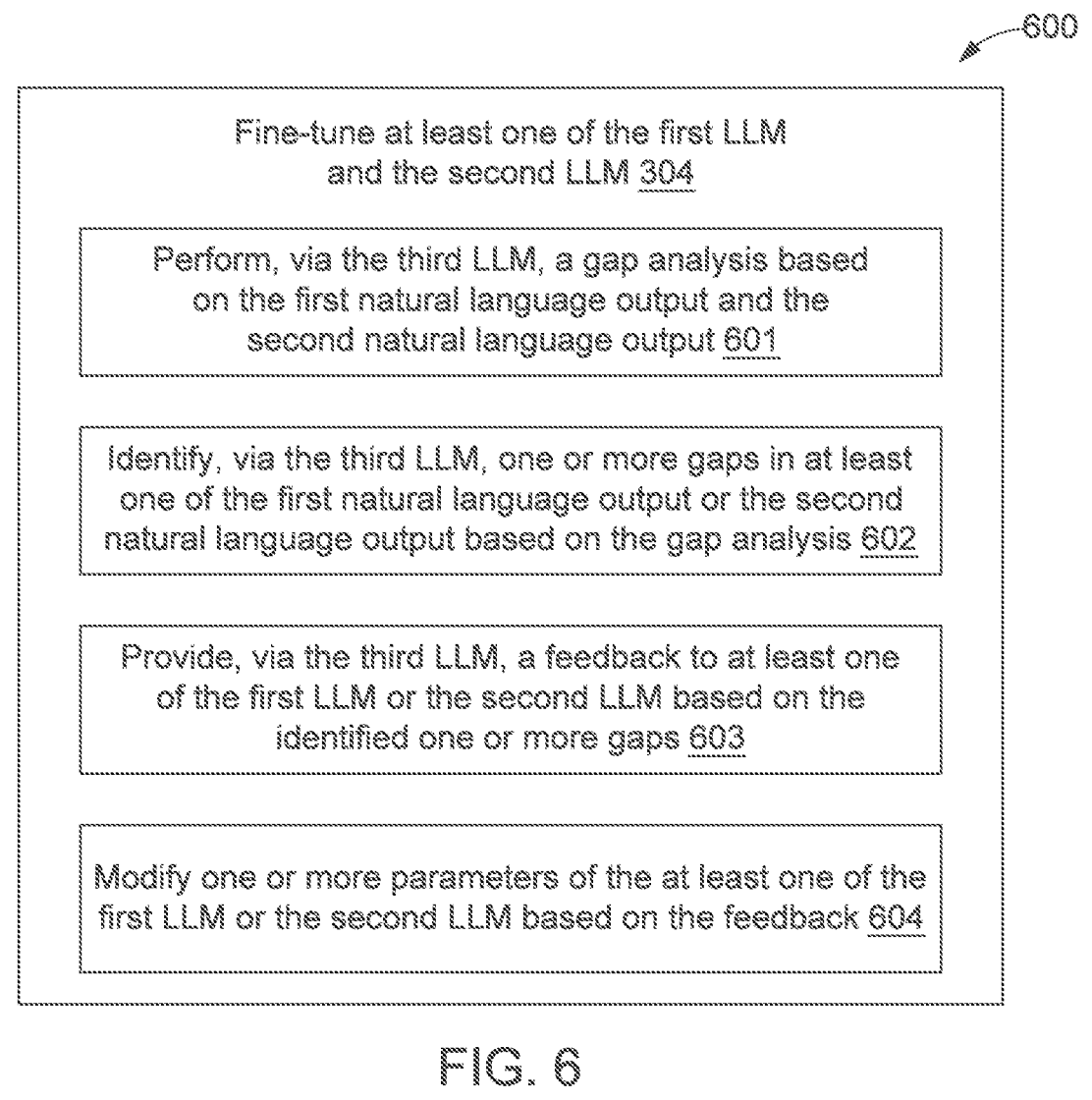

Fine-tune at least one of the first LLM and the second LLM 304

Perform, via the third LLM, a gap analysis based on the first natural language output and the second natural language output 601

Identify, via the third LLM, one or more gaps in at least one of the first natural language output or the second natural language output based on the gap analysis 602

Provide, via the third LLM, a feedback to at least one of the first LLM or the second LLM based on the identified one or more gaps 603

Modify one or more parameters of the at least one of the first LLM or the second LLM based on the feedback 604

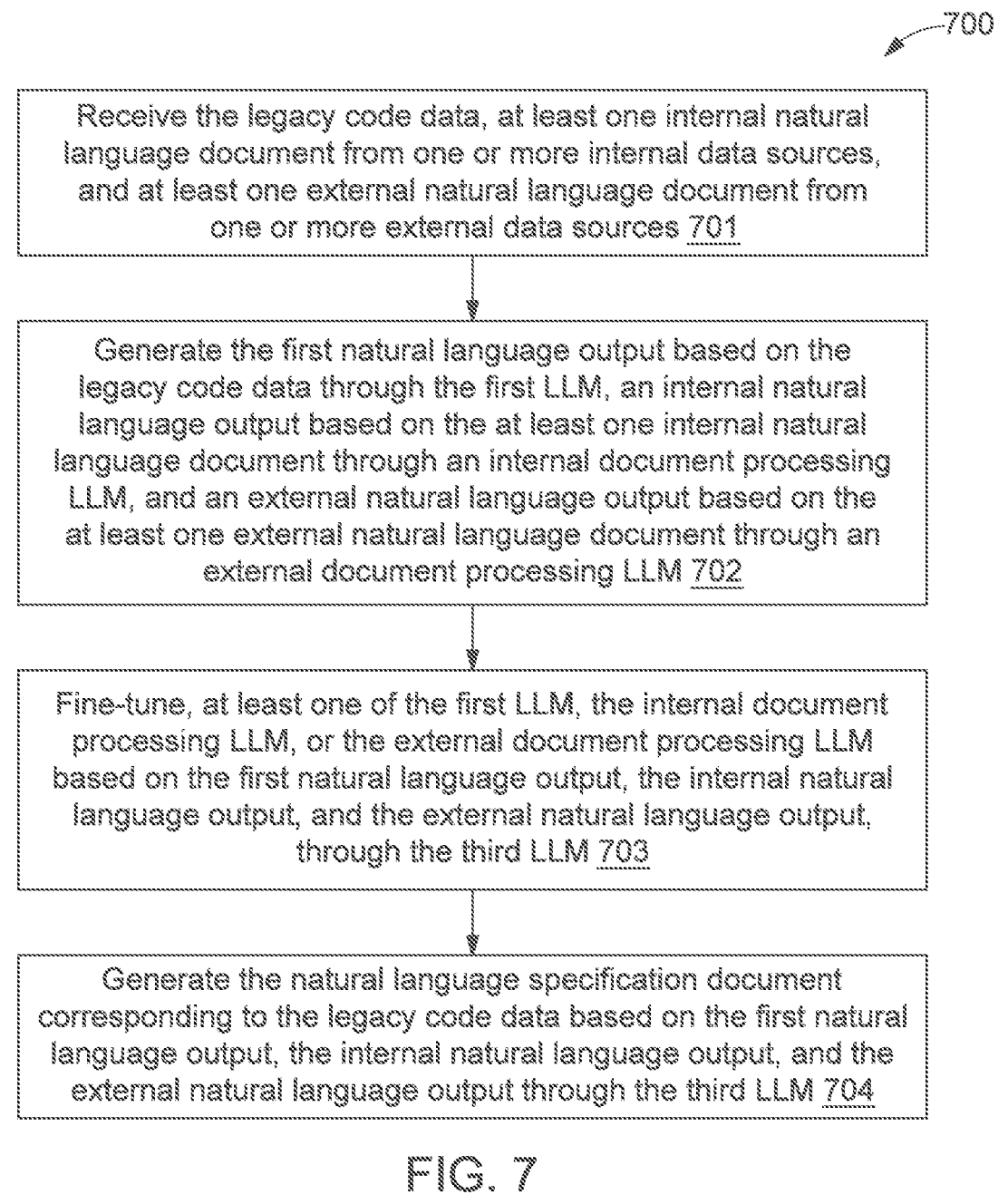

Receive the legacy code data, at least one internal natural language document from one or more internal data sources, and at least one external natural language document from one or more external data sources 701

Generate the first natural language output based on the legacy code data through the first LLM, an internal natural language output based on the at least one internal natural language document through an internal document processing LLM, and an external natural language output based on the at least one external natural language document through an external document processing LLM 702

Fine-tune, at least one of the first LLM, the internal document processing LLM, or the external document processing LLM based on the first natural language output, the internal natural language output, and the external natural language output, through the third LLM 703

Generate the natural language specification document corresponding to the legacy code data based on the first natural language output, the internal natural language output, and the external natural language output through the third LLM 704

FIG. 7

METHOD AND SYSTEM FOR LEGACY CODE TRANSFORMATION

CROSS-REFERENCE TO RELATED APPLICATION

This application claims priority to Indian Patent Application number 202341053446, filed on Aug. 9, 2023, which is hereby incorporated by reference in its entirety.

TECHNICAL FIELD

This disclosure relates generally to legacy code transformation, and more particularly to a method and a system for legacy code transformation through generative AI models.

BACKGROUND

Various organizations, such as banking, insurance, or government, built using legacy programming languages (for example, a common business-oriented language (COBOL)), pose significant challenges in terms of maintenance, scalability, and integration with modern technologies. As organizations strive to modernize their software systems, there is a growing need for efficient and accurate methods to transform legacy codebases into modernized code languages.

Financial institutions often face significant challenges with their aging legacy systems, particularly those heavily dependent on mainframe platforms and the COBOL programming language. These systems, of which approximately 43% of all banking systems, present obstacles for modernization efforts. Traditional large-scale modernization programs may stretch over a decade and have a low success rate, which creates hesitation among banks to embark on such endeavors.

One of the key technical problems encountered in legacy language transformation is the manual or line-by-line code conversion process, which lacks a comprehensive understanding of a code's context. This approach often results in monolithic code structures that are difficult to maintain, and the migration process becomes time-consuming and costly. Code refactoring becomes a considerable undertaking, further hindering the modernization efforts.

To understand legacy landscape, several tools have been developed for extracting business rules and providing inventory and dead code analysis. However, these tools only assist with manual efforts and do not offer end-to-end automation. In large-scale legacy modernization programs, reverse engineers work closely with business analysts to manually create detailed specification documents, which may be a labor-intensive and error-prone process.

Moreover, financial institutions encounter challenges when modernizing legacy batch processes. These processes are often tightly coupled and complex, making it difficult to trace dependencies between different components. The monolithic nature of batch system further complicates the transition to real-time operations, impeding efforts to enhance straight-through processing.

Recent advancements in generative Artificial Intelligence (AI) techniques, such as codex transformers and unsupervised neural machine translation (NMT), have shown promise in understanding, generating, and translating source code. However, these models have predominantly been trained on modern programming languages like Java and Python, and their applicability to legacy languages is limited.

There is, therefore, a need in the present state of art, for techniques to address the challenges faced by various organizations in legacy language transformation. The proposed techniques may focus on the transformation of the legacy codebases such as COBOL to a modernized code language, such as java or python, ensuring improved system agility while reducing timeline typically associated with such transformations.

SUMMARY

In one embodiment, a method for facilitating legacy code transformation is disclosed. In one example, the method may include receiving legacy code data and at least one natural language document from one or more data sources. Further, the method may include generating a first natural language output based on the legacy code data through a first Large Language Model (LLM), and a second natural language output based on the at least one natural language document through a second LLM. The first natural language output may include domain context or code explanation corresponding to the legacy code data, and the second natural language output may include extracted knowledge from the at least one natural language document. Further, the method may include fine-tuning at least one of the first LLM or the second LLM based on the first natural language output and the second natural language output, through a third LLM. Further, the method may include generating a natural language specification document corresponding to the legacy code data based on the first natural language output and the second natural language output through the third LLM.

In one embodiment, a system for facilitating legacy code transformation is disclosed. In one example, the system may include a processor and a computer-readable medium communicatively coupled to the processor. The computer-readable medium may store processor-executable instructions, which, on execution, may cause the processor to receive legacy code data and at least one natural language document from one or more data sources. Further, the processor-executable instructions, on execution, may further cause the processor to generate a first natural language output based on the legacy code data through a first Large Language Model (LLM), and a second natural language output based on the at least one natural language document through a second LLM. The first natural language output may include domain context or code explanation corresponding to the legacy code data, and the second natural language output may include extracted knowledge from the at least one natural language document. Further, the processor-executable instructions, on execution, may further cause the processor to fine-tune at least one of the first LLM or the second LLM based on the first natural language output and the second natural language output, through a third LLM. Further, the processor-executable instructions, on execution, may further cause the processor to generate a natural language specification document corresponding to the legacy code data based on the first natural language output and the second natural language output through the third LLM.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

FIG. 4 is a flow diagram of an exemplary process for training a first LLM, in accordance with an exemplary embodiment of the present disclosure;

FIG. 5 is a flow diagram of an exemplary process for generating a first natural language output, in accordance with an exemplary embodiment of the present disclosure;

FIG. 6 is a flow diagram of an exemplary process for fine-tuning at least one of a first LLM and a second LLM, in accordance with an exemplary embodiment of the present disclosure;

FIG. 7 a flow diagram of an exemplary process for facilitating legacy code transformation, in accordance an exemplary embodiment of the present disclosure;

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
FIG. 1 is a block diagram of an environment for facilitating legacy code transformation, in accordance with an exemplary embodiment of the present disclosure.

FIG. 1 is a diagram that illustrates a block diagram of an environment 100 for facilitating legacy code transformation, in accordance with an exemplary embodiment of the present disclosure.

The environment 100 may include a user device 101, and a computing device 102. The user device 101 and the computing device 102 are configured to communicate with each other via a communication network 103. Examples of the communication network 103 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

As will be described in greater detail in conjunction with FIGS. 2-11, in order to transform the legacy code (for example, COBOL) to a modernized code (for example, Java, or Python), initially, the communication network 103 may facilitate data exchange between the user device 101 and the computing device 102. Specifically, the computing device 102 receives data (for example, legacy code data and one or more natural language documents) from the user device 101 via the communication network 103.

As will be appreciated by those skilled in the art, the techniques described herein are not limited to the transformation of COBOL codebases alone, but encompass a broader scope of legacy codebases. These techniques are designed to facilitate the transition from various legacy languages, including but not limited to COBOL, to modernized code languages such as Java or Python. It is understood that legacy systems may be written in diverse programming languages, and the techniques described herein are adaptable and extensible to address the challenges posed by different legacy codebases.

The user device 101 may include a legacy codebase for storing the legacy code data, internal data sources for storing internal natural language documents, and external data sources for storing external natural language documents. Examples of the user device 101 may include a smartphone, a tablet, a laptop, a desktop, a notebook, a mobile phone, an application server, or the like.

The legacy code data encompasses various elements associated with legacy codebase, including but not limited to, online and batch programs, copybooks, job control language (JCL), control cards, scripts, stored procedures, and schedules. The internal natural language document includes unstructured data such as lifecycle documents, standard operating procedures (SOPs), use cases, configuration management database (CMDB), design documents, incident management systems, human-generated emails, blogs, knowledge repositories, and knowledge transfer sessions. The external natural language document includes industry references, standard documents, and reference frameworks.

The computing device 102 may further utilize at least two distinct large language models (LLMs) (for example, a first LLM and a second LLM). The first LLM may generate a first natural language output based on the legacy code data, providing domain context or code explanations relevant to the legacy code. These expanded code provide a detailed and human-readable representation of the code's functionality and structure.

Alternatively, the first LLM may generate summaries of code comments in natural language, based on the code comments present in the legacy code data. These summaries are then incorporated into the first natural language output, offering concise and informative descriptions of the code's purpose and behaviour.

Meanwhile, the second LLM may generate a second natural language output based on the at least one natural language document, extracting knowledge and information contained within the documents.

In some embodiments, the second natural language output may be derived from a combination of both the internal and external natural language documents. In such embodiments, the computing device 102 may employ two distinct LLMs (such as, an internal document processing LLM and an external document processing LLM), one for generating the internal natural language output and another for generating the external natural language output. Alternatively, the computing device 102 may employ a single LLM (e.g., the second LLM) to generate both the internal and external natural language outputs.

Once the first natural language output and the second language output are generated, the computing device 102 may further fine-tune at least one of the first LLM or the second LLM based on the first natural language output and the second natural language output.

To fine-tune the at least one of the first LLM or the second LLM, the computing device 102 may employ a third LLM. The third LLM may be an Artificial Intelligence (AI) based convergent LLM that may be dedicated to analyzing and identifying gaps between the first natural language output and the second language output.

Once the gaps are identified, they are fed back to the LLMs of the respective data sources. Human experts, such as developers or domain specialists, may review the natural language outputs to provide feedback on their accuracy, completeness, and context relevance. This human-assisted feedback may serve as valuable information to fine-tune the LLM models. The feedback may help to identify areas where the natural language outputs may be improved, and the LLM models may be adjusted accordingly to enhance their language understanding and generation capabilities.

To improve performance of the at least one of the first LLM or the second LLM based on the feedback received from the gap analysis, the computing device 102 may modify one or more parameters of the at least one of the first LLM or the second LLM. This modification may include adjusting internal settings, weights, and configurations of the LLMs to better suit the specific task of legacy code transformation and natural language document understanding.

The process of modification may be iterative, and for this the computing device 102 may fine-tune the at least one of the first LLM or the second LLM multiple times using the feedback to achieve continuous improvement. By adjusting the parameters, each of the first LLM or the second LLM may become more contextually aware, capturing domain-specific knowledge, and generating more accurate and relevant natural language outputs.

Further, the computing device 102 may generate a natural language specification document corresponding to the legacy code data based on the first natural language output and the second natural language output through the third LLM. The natural language specification document may provide essential guidelines, rules, and requirements necessary for the transformation process. It may capture a domain context, code explanations, and extracted knowledge, ensuring that the modernization effort aligns with the intended objectives and requirements. It should be noted that each of the first LLM, the second LLM, and the third LLM may be an encoder-decoder transformer architecture-based generative AI model.

The encoder-decoder transformer architecture is a powerful and widely used framework for natural language processing tasks. In this architecture, the encoder component processes input data and converts it into a fixed-size representation, capturing contextual information and domain-specific knowledge. The decoder component takes the fixed-size representation as input and generates an output sequence, such as a natural language output.

By adopting the encoder-decoder transformer architecture, each of the LLM models may effectively handle complexities of understanding and generating natural language representations. The transformer architecture, with its self-attention mechanism, allows the LLM models to focus on relevant parts of the input and efficiently capture long-range dependencies within the data.

As generative AI models, the LLMs may generate human-like text that is contextually relevant and coherent. They may understand the nuances of both the legacy code data and the natural language documents, facilitating accurate conversion and specification generation.

Additionally, the computing device 102 may utilize a code-generating generative AI model to generate modern code data corresponding to the legacy code data based on the natural language specification document. The modern code data may be a transformation of the legacy code data in a modernized code language.

In a more elaborative way, the code-generating generative AI model interprets the natural language specification document and translates it into a desired modern code language, such as Java. The modern code data generated by this process represents a modernized version of the original legacy code.

The modern code data aligns with the guidelines and requirements specified in the natural language specification document, ensuring that the transformed code complies with the intended modernization goals. This modernized code may further be deployed and integrate within an organization's updated software infrastructure, contributing to the overall enhancement and efficiency of the legacy system.

Figure 2:
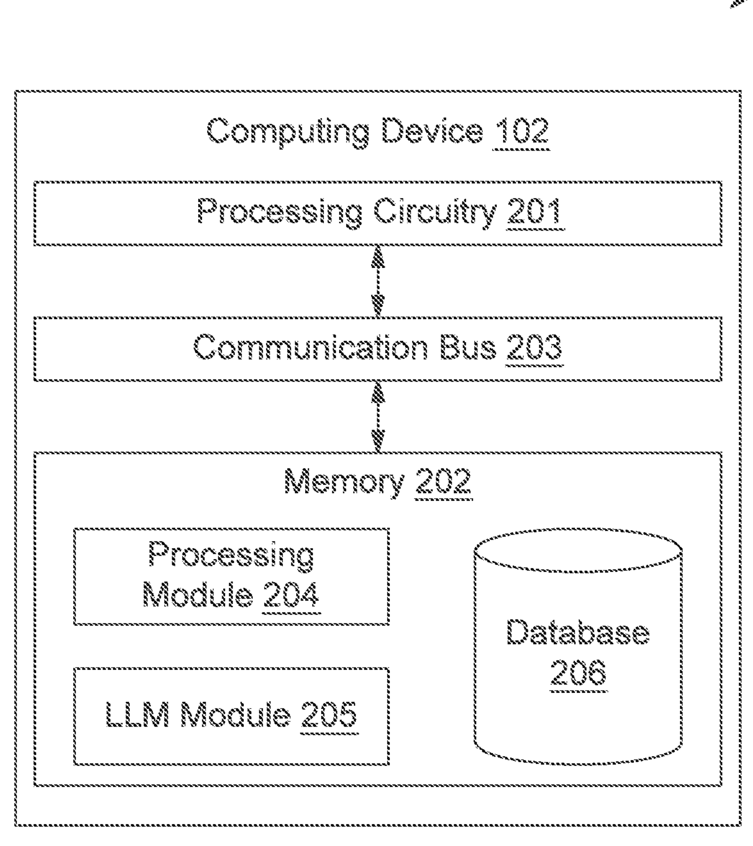
FIG. 2 is a block diagram of a computing device for facilitating legacy code transformation, in accordance with an exemplary embodiment of the present disclosure.

FIG. 2 is a block diagram 200 of a computing device 102 for facilitating legacy code transformation, in accordance with an exemplary embodiment of the present disclosure. FIG. 2 is explained in conjunction with elements from FIG. 1. The computing device 102 may include a processing circuitry 201 and a memory 202 communicatively coupled to the processing circuitry 201 via a communication bus 203. The memory 202 may store processor instructions. The processor instructions, when executed by the processing circuitry 201, may cause the processing circuitry 201 to implement one or more embodiments of the present disclosure. The memory 202 may include a processing module 204, a large language model (LLM) module 205, and a database 206.

The database 206 may store legacy code data, and natural language documents (for example, internal natural language documents, and external natural language documents). Once the computing device 102 receives the legacy code data and at least one natural language document from the database 206, the processing module 204 may pre-process the legacy code data and the at least one natural language document.

To further elaborate, the pre-processing may include segregating a COBOL code within the legacy code data into distinct elements, including variables, file operations, SQL/DB operations, function blocks, user interactions, and comments. The pre-processing is aimed at organizing and categorizing the elements of the COBOL code, providing a structured representation of its different functionalities. By segregating the code into specific elements, such as variables, file operations, etc., the processing module 204 prepares the data for further analysis and transformation. The pre-processed data may act as a foundation for the generation of the first natural language output and the extraction of knowledge for the subsequent stages of the legacy code transformation.

The LLM module 205 may include a first LLM, a second LLM, and a third LLM, and a code-generating generative AI model. The first LLM may be configured to generate a first natural language output based on the legacy code data. This output may include domain context or code explanations that correspond to the legacy code data. In other words, the first LLM may convert the legacy codebase into a human-readable format, providing valuable information related to a functionality and structure of the legacy code.

The second LLM may generate a second natural language output based on the at least one natural language document. This output may include extracted knowledge and information from the natural language document. By analyzing the natural language document, the second LLM may capture relevant data and context to be used in the transformation process.

In a more elaborative way, the second LLM processes one or more internal natural language documents, which may include various types of unstructured data-life cycle documents, SOPs, use cases, CMDB, design documents, incident management systems, human-generated emails, blogs, knowledge repositories, and knowledge transfer sessions. The second LLM analyzes these internal documents and extracts pertinent information relevant to the legacy codebase.

Additionally, the second LLM also processes one or more external natural language documents, which may include industry references, standard documents, and reference frameworks. These external documents often provide valuable industry-specific standards, best practices, and guidelines that are crucial for the modernization process.

Through the analysis of both internal and external natural language documents, the second LLM generates the second natural language output, capturing important knowledge and domain-specific details relevant to the legacy code transformation. It should be noted that the second natural language output may be generated either by single second LLM or by combination of internal document processing LLM and external document processing LLM.

In other words, in one embodiment, the second LLM may be designed to handle the analysis of diverse document types and extract relevant information from both internal and external sources. This single second LLM may generate the second natural language output, combining information from both types of documents.

In other embodiment, the second natural language output may be generated by a combination of LLMs, each specialized in processing a specific type of document. This means that there may be one LLM focused on analyzing and extracting information from internal natural language documents (such as SOPs, design documents, etc.), and another LLM specialized in processing external natural language documents (such as industry references and standards). The combination of the outputs from these specialized LLMs results in the complete second natural language output.

Both approaches have their advantages and may be selected based on factors such as the complexity and variety of the natural language documents, the scale of the legacy codebase, and the specific requirements of the legacy language transformation project.

Further, the third LLM may fine-tune at least one of the first LLM or the second LLM based on the first natural language output and the second natural language output. The fine-tuning may include updating parameters and weights of the first LLM and the second LLM based on the feedback derived from the first and second natural language outputs.

The fine-tuning process may be essential for ensuring that the LLMs align more accurately with the specific requirements and context of the legacy code transformation task. By learning from the generated natural language outputs, the LLMs become better equipped to produce contextually relevant and accurate outputs in subsequent iterations of the transformation process. The process of fine-tuning is explained in detail in conjunction with FIG. 6.

Further, the third LLM may generate a natural language specification document corresponding to the legacy code data based on the first natural language output and the second natural language output. The natural language specification document may act as a detailed guide that encapsulates essential information from both the legacy code data and the extracted knowledge from the natural language documents. By combining the first and second natural language outputs, the third LLM generates a detailed specification that outlines the necessary steps and guidelines for the modernization of the legacy code.

The content of the natural language specification document may include, but is not limited to, transformation requirements, modernization strategies, design patterns, architectural considerations, and other critical elements required for a successful transformation of the legacy code into a modernized code language.

Further, the code-generating generative AI model may generate modern code data corresponding to the legacy code data based on the natural language specification document. The modern code data may be a transformation of the legacy code data in a modernized code language.

By interpreting the detailed specifications and guidelines outlined in the natural language specification document, the code-generating generative AI model may generate modern code that aligns with the requirements and objectives of the modernization process. This code generation includes various aspects, such as refactoring, optimization, code restructuring, and incorporating best practices in the modernized code.

In some embodiments, the LLM module 205 may be responsible to train the first LLM using a training dataset. The training may be performed using a self-supervised learning technique. The training dataset may include a source code dataset and natural language specification corresponding to the source code dataset.

In some embodiments, the LLM module 205 may train the first LLM to configure it for generating code explanation corresponding to the legacy code data in the first natural language output. To accomplish this, the training dataset may include legacy code language information along with their respective explanations.

Additionally, in some embodiments, the LLM module 205 may train the first LLM to configure it for generating domain context in the first natural language output. The training dataset utilized for this purpose may include textual data relevant to the domain context.

It should be noted that all such aforementioned modules 204-205 may be represented as a single module or a combination of different modules. Further, as will be appreciated by those skilled in the art, each of the modules 204-205 may reside, in whole or in parts, on one device or multiple devices in communication with each other. In some embodiments, each of the modules 204-205 may be implemented as dedicated hardware circuit comprising custom application-specific integrated circuit (ASIC) or gate arrays, off-the-shelf semiconductors such as logic chips, transistors, or other discrete components. Each of the modules 204-205 may also be implemented in a programmable hardware device such as a field programmable gate array (FPGA), programmable array logic, programmable logic device, and so forth. Alternatively, each of the modules 204-205 may be implemented in software for execution by various types of processors (e.g., the processing circuitry 201). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for facilitating legacy code transformation. For example, the exemplary computing device 102 may facilitate transformation of the legacy code to a modernized code by the processes discussed herein. In particular, as will be appreciated by those of ordinary skill in the art, control logic and/or automated routines for performing the techniques and steps described herein may be implemented by the computing device 102 either by hardware, software, or combinations of hardware and software. For example, suitable code may be accessed and executed by the one or more processors on the computing device 102 to perform some or all of the techniques described herein. Similarly, application specific integrated circuits (ASICs) configured to perform some or all of the processes described herein may be included in the one or more processors on the computing device 102.

Figure 3:
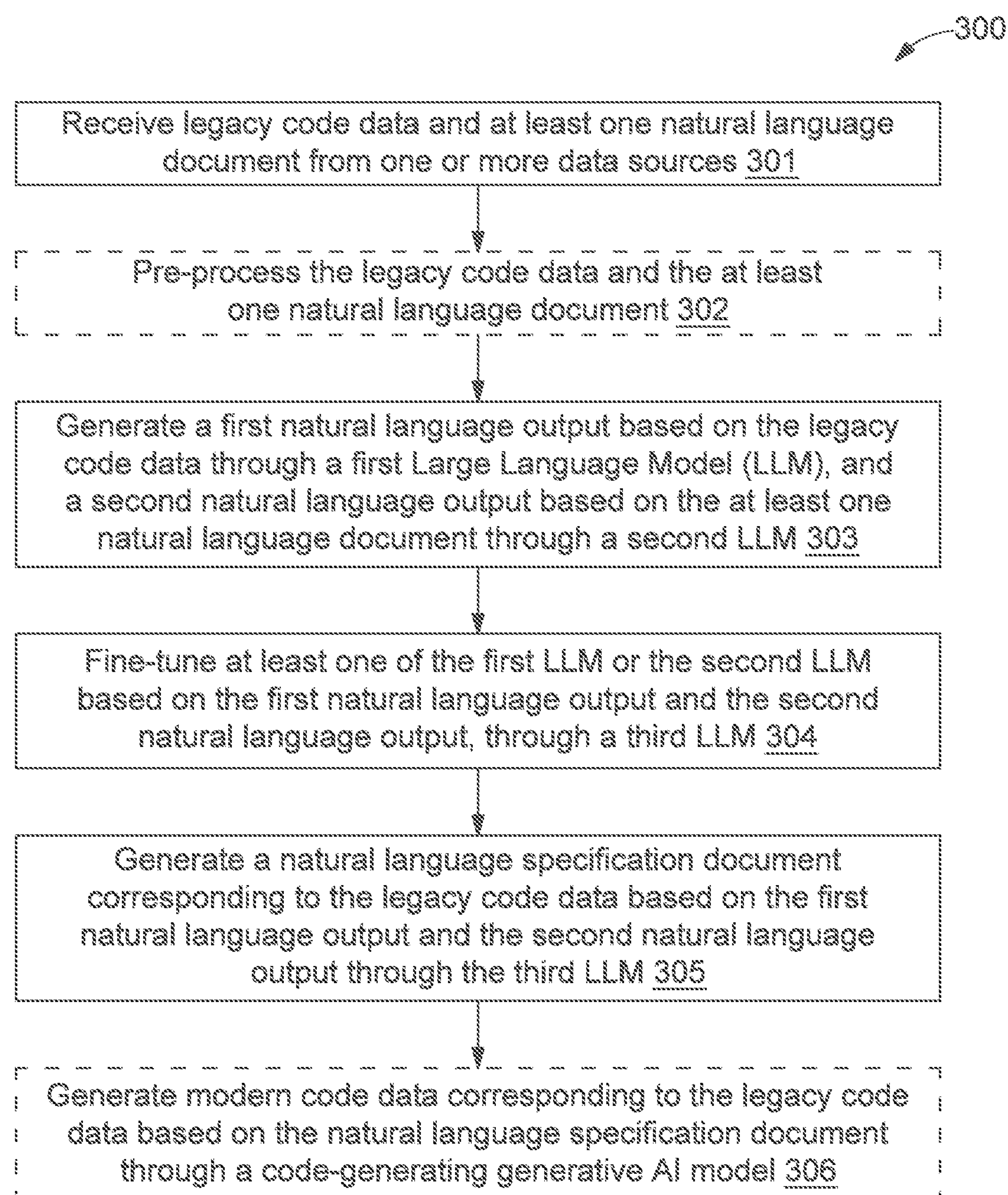
FIG. 3 is a flow diagram of an exemplary process for facilitating legacy code transformation, in accordance with an exemplary embodiment of the present disclosure.

FIG. 3 is a diagram that illustrates an exemplary process 300 for facilitating legacy code transformation is depicted via a flowchart, in accordance with an exemplary embodiment of the present disclosure. FIG. 3 is explained in conjunction with elements from FIGS. 1 and 2. In an embodiment, the process 300 may be implemented by the computing device 102. The process 300 may include receiving legacy code data and at least one natural language document from one or more data sources, at step 301.

Further, the process 300 may include pre-processing the legacy code data and the at least one natural language document, at step 302. Further, the process 300 may include generating a first natural language output based on the legacy code data through a first LLM, and a second natural language output based on the at least one natural language document through a second LLM, at step 303. The first natural language output may include domain context or code explanation corresponding to the legacy code data, and the second natural language output may include extracted knowledge from the at least one natural language document.

Further, the process 300 may include fine-tuning at least one of the first LLM or the second LLM based on the first natural language output and the second natural language output, through a third LLM, at step 304. A process of fine-tuning the at least one of the first LLM or the second LLM is explained in detail in conjunction with FIG. 6.

Further, the process 300 may include generating a natural language specification document corresponding to the legacy code data based on the first natural language output and the second natural language output through the third LLM, at step 305. In some embodiments, an alternative approach may be employed, where the process 300 may generate a Domain-Specific Language (DSL) specification document. Similar to the natural language specification document, the DSL specification document may also be based on the first natural language output and the second natural language output, achieved through the third LLM.

Both types of specification documents, whether in natural language or Domain-Specific Language, may serve as detailed and comprehensive guidelines for modernizing the legacy codebase. It may include critical information, requirements, and recommendations derived from the legacy code data and the information obtained from the analysis of natural language documents. These specification documents become invaluable references for the subsequent stages of the legacy language transformation process, guiding developers throughout the modernization journey.

Further, the process 300 may include generating modern code data corresponding to the legacy code data based on the natural language specification document through a code-generating generative AI model, at step 306.

FIG. 4 is a diagram that illustrates an exemplary process 400 for training a first LLM is depicted via a flowchart, in accordance with an exemplary embodiment of the present disclosure. FIG. 4 is explained in conjunction with elements from FIGS. 1, 2, and 3. In an embodiment, the process 400 may be implemented by the computing device 102. The process 400 may include training the first LLM using a training dataset through a self-supervised learning technique, at step 401.

The self-supervised learning technique may enable the first LLM to learn from the training dataset without the need for explicit labels. The training dataset may include a set of source code data (representing the legacy codebase) and their corresponding natural language specifications. During the training process, the first LLM may utilize a relationship between the source code and its associated natural language specifications to learn and map the two, effectively acquiring the ability to generate natural language outputs that may correspond to the legacy codebase.

In an embodiment, to train the first LLM, the process 400 may include configuring the first LLM to generate the code explanation corresponding to the legacy code data in the first natural language output, at step 402. The training dataset may include legacy code language information and corresponding explanation.

Alternatively, to train the first LLM, the process 400 may include configuring the first LLM to generate the domain context in the first natural language output, at step 403. The training dataset may include textual data. Through this training process the first LLM may produce contextually relevant and accurate language outputs, laying a foundation for subsequent stages of the legacy code transformation.

FIG. 5 is a diagram that illustrates an exemplary process 500 for generating a first natural language output is depicted via a flowchart, in accordance with an exemplary embodiment of the present disclosure. FIG. 5 is explained in conjunction with elements from FIGS. 1, 2, 3, and 4. In an embodiment, the process 500 may be implemented by the computing device 102. As previously explained in reference to FIG. 3, the first natural language output may be generated based on the legacy code data, at step 303.

In an embodiment, to generate the first natural language output, the process 500 may include generating expanded code functions corresponding to the legacy code data in natural language, at step 501. The first natural language output may include the expanded code functions.

These expanded code functions provide a comprehensive and detailed representation of the functionality and operations present within the legacy codebase. The first natural language output may be enhanced with these expanded code functions, ensuring that it includes an exhaustive and detailed account of the legacy codebase's operations and capabilities. By incorporating the expanded code functions into the first natural language output, the output becomes more informative and expressive, capturing the complexities of the legacy code.

Alternatively, in some embodiments, to generate the first natural language output, the process 500 may include generating summaries of code comments in the legacy code data in natural language, at step 502. The first natural language output may include the summaries. These summaries may capture the essence of the comments present within the legacy codebase and present them in a concise and understandable format.

When integrated into the first natural language output, these summaries may enhance its clarity and readability by providing valuable information from the code comments. The inclusion of code comment summaries may allow developers to gain a quick understanding of the intentions, explanations, and context embedded in the legacy code. This concise representation of code comments in the first natural language output may help in understanding and analysing the legacy codebase, facilitating a smoother modernization process.

FIG. 6 is a diagram that illustrates an exemplary process 600 for fine-tuning at least one of a first LLM and a second LLM is depicted via a flowchart, in accordance with an exemplary embodiment of the present disclosure. FIG. 6 is explained in conjunction with elements from FIGS. 1, 2, 3, 4, and 5. In an embodiment, the process 600 may be implemented by the computing device 102. As explained earlier in reference to FIG. 3, the at least one of the first LLM and the second LLM may be fine-tuned, at step 304.

Therefore, to fine-tune the at least one of the first LLM and the second LLM, the process 600 may include performing, via the third LLM, a gap analysis based on the first natural language output and the second natural language output, at step 601.

Further, the process 600 may include identifying, via the third LLM, one or more gaps in at least one of the first natural language output or the second natural language output based on the gap analysis, at step 602. During the gap analysis, the third LLM may identify any discrepancies or gaps that may exist between the first natural language output and the second natural language output, as compared to the information derived from the legacy codebase.

Further, the process 600 may include providing, via the third LLM, a feedback to at least one of the first LLM or the second LLM based on the identified one or more gaps, at step 603. The fine-tuning may be based on human-assisted feedback corresponding to the first natural language output and the second natural language output. In particular, the identified gaps may be manually addressed through a feedback loop that involve human experts.

Further, the process 600 may include modifying one or more parameters of the at least one of the first LLM or the second LLM based on the feedback, at step 604. The modification may include updating weights, adjusting internal configurations, and learned representations within the LLMs, guided by the feedback received from the gap analysis and the human-assisted review of the natural language outputs.

When the feedback loop identifies discrepancies or inadequacies in the first and second natural language outputs generated by the first and second LLMs, it indicates areas where the LLM models may be enhanced. To address these areas of improvement, the fine-tuning process may adjust the internal parameters of the LLMs. By doing so, the LLMs' natural language generation capabilities may be refined, leading to more accurate, contextually relevant, and high-quality representations of the legacy code and associated natural language documents.

FIG. 7 is a diagram that illustrates an exemplary process 700 for facilitating legacy code transformation is depicted via a flowchart, in accordance with an exemplary embodiment of the present disclosure. FIG. 7 is explained in conjunction with elements from FIGS. 1, 2, 3, 4, 5, and 6. In an embodiment, the process 700 may be implemented by the computing device 102. As mentioned earlier in reference to FIG. 3, the process 300 may include receiving legacy code data and at least one natural language document from one or more data sources, at step 301.

Since, the one or more data sources may include an external data source or an internal data source, therefore the present process 700 is explained in relation to the received natural language documents from either the external data source or the internal data source. At step 701, the process 700 may include receiving the legacy code data, at least one internal natural language document from one or more internal data sources, and at least one external natural language document from one or more external data sources.

Further, process 700 may include generating the first natural language output based on the legacy code data through the first LLM, an internal natural language output based on the at least one internal natural language document through an internal document processing LLM, and an external natural language output based on the at least one external natural language document through an external document processing LLM, at step 702.

Further, process 700 may include fine-tuning at least one of the first LLM, the internal document processing LLM, or the external document processing LLM based on the first natural language output, the internal natural language output, and the external natural language output, through the third LLM, at step 703.

Further, the process 700 may include generating the natural language specification document corresponding to the legacy code data based on the first natural language output, the internal natural language output, and the external natural language output through the third LLM, at step 704.

In some embodiments, once the natural language specification document is generated, the process 700 may further include generating modern code data corresponding to the legacy code data based on the natural language specification document through a code-generating generative AI model. The modern code data may be a transformation of the legacy code data in a modernized code language.

Figure 8:
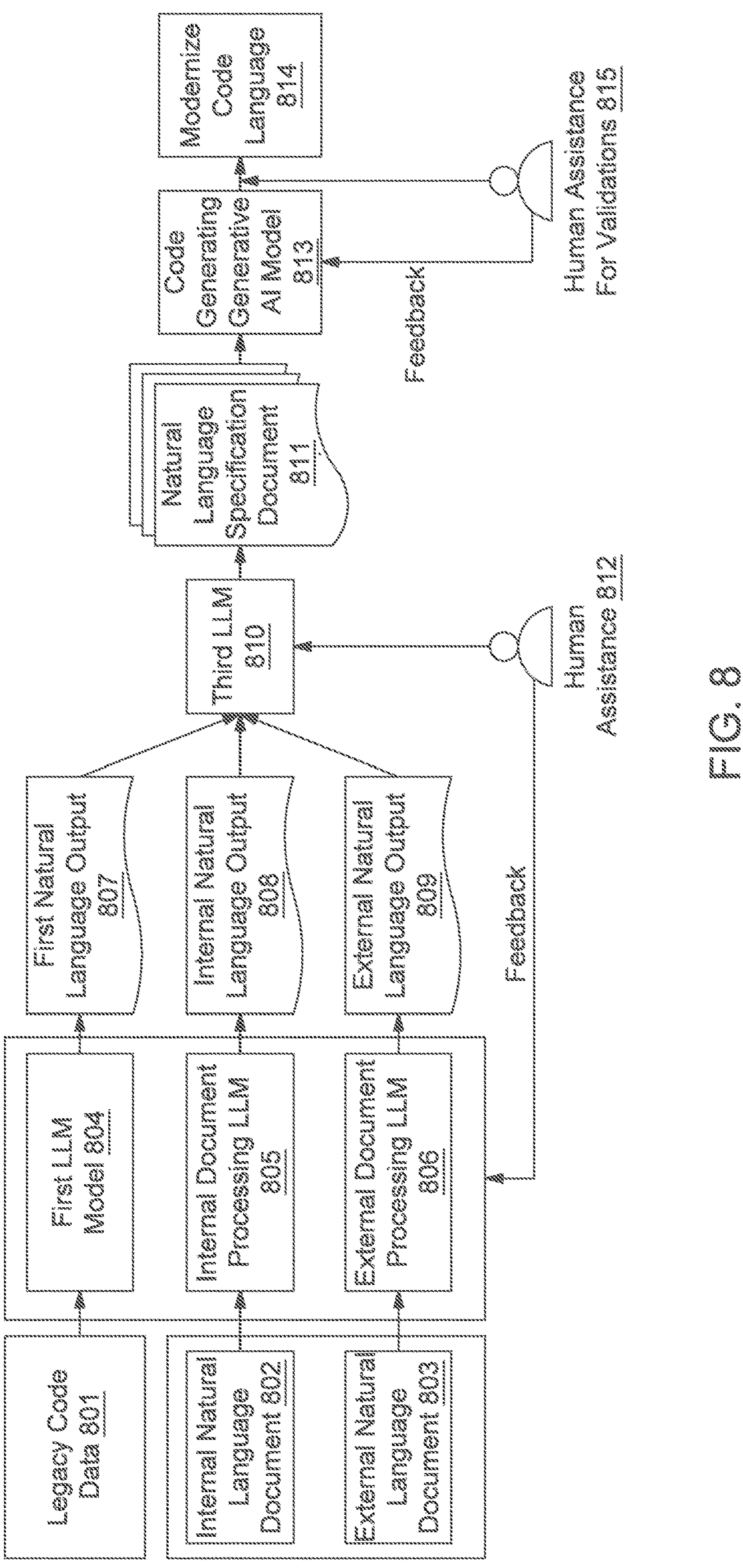
FIG. 8 is a diagram that illustrates transformation of a legacy code data to a modernized code, in accordance with an exemplary embodiment of the present disclosure.

FIG. 8 is a diagram that illustrates transformation of a legacy code data to a modernized code, in accordance with an exemplary embodiment of the present disclosure. FIG. 8 is explained in conjunction with elements from FIGS. 1, 2, 3, 4, 5, 6, and 7. In order to transform the legacy code data to the modernized code, initially, the legacy code data 801, an internal natural language document 802, and an external natural language document 803 may be provided as inputs to three distinct Large Language Model (LLM) models i.e., the first LLM model 804, the internal document processing LLM 805, and the external document processing LLM 806.

These LLMs may process the input data and generate corresponding natural language outputs. Specifically, the first LLM model 804 may generate a first natural language output 807 based on the legacy code data 801, while the internal document processing LLM 805 may generate the internal natural language output 808 based on the internal natural language document 802. Similarly, the external document processing LLM 806 may generate an external natural language output 809 based on the external natural language document 803.

Subsequently, a third LLM 810 (for example, an artificial intelligence (AI) based convergent LLM model), may receive the first natural language output 807, the internal natural language output 808, and the external natural language output 809 as inputs. The third LLM 810 may then perform a fine-tuning process on at least one of the first LLM 804, the internal document processing LLM 805, or the external document processing LLM 806. This fine-tuning may be based on human-assisted feedback 812 corresponding to the first natural language output 807, the internal natural language output 808, and the external natural language output 809, ensuring that the LLM models improve and align their language generation capabilities.

Further, the third LLM 810 may generate a natural language specification document 811 corresponding to the legacy code data 801 based on the first natural language output 807, the internal natural language output 808 and the external natural language output 809. The generated natural language specification document 811 (preferably, in English language) outlines detailed guidelines, rules, and requirements for modernizing the legacy code.

Once the natural language specification document 811 is generated, further a code-generating generative AI model 813 may generate modern code data corresponding to the legacy code data 801. The modern code data represents a transformation of the legacy code into a modernized code language 814 (such as, Java), driven by the guidelines and requirements specified in the natural language specification document 811.

During the code generation process, the code-generating generative AI model 813 (such as Alphacode, Codex, etc.) use natural language specification document 811 to produce a modern code. However, as AI models are not perfect and may have limitations or biases, human assistance play a crucial role in verifying the quality of the output. Human assistance for validation 815 may include checking if the generated modern code meets the desired transformation goals, adheres to coding best practices, and complies with any specific guidelines or requirements. If any issues, errors, or improvements are identified during the review, human experts provide feedback and corrections to refine the code generation process.

In some embodiments, the natural language specification document 811 may serve additional purposes beyond guiding the modern code generation process. In particular, it may be utilized to generate and recommend test cases that may be aligned with the specified functionality and requirements in the legacy code. The natural language specification document 811 may help to ensure that the modernized code meets the desired performance and functionality standards.

Additionally, the natural language specification document 811 may be utilized to generate a dependency graph. This graph may represent the relationships and interdependencies between various components and functions in the modernized code. By visualizing these dependencies, developers may better understand the code structure and identify potential bottlenecks or areas for optimization.

Figure 9:
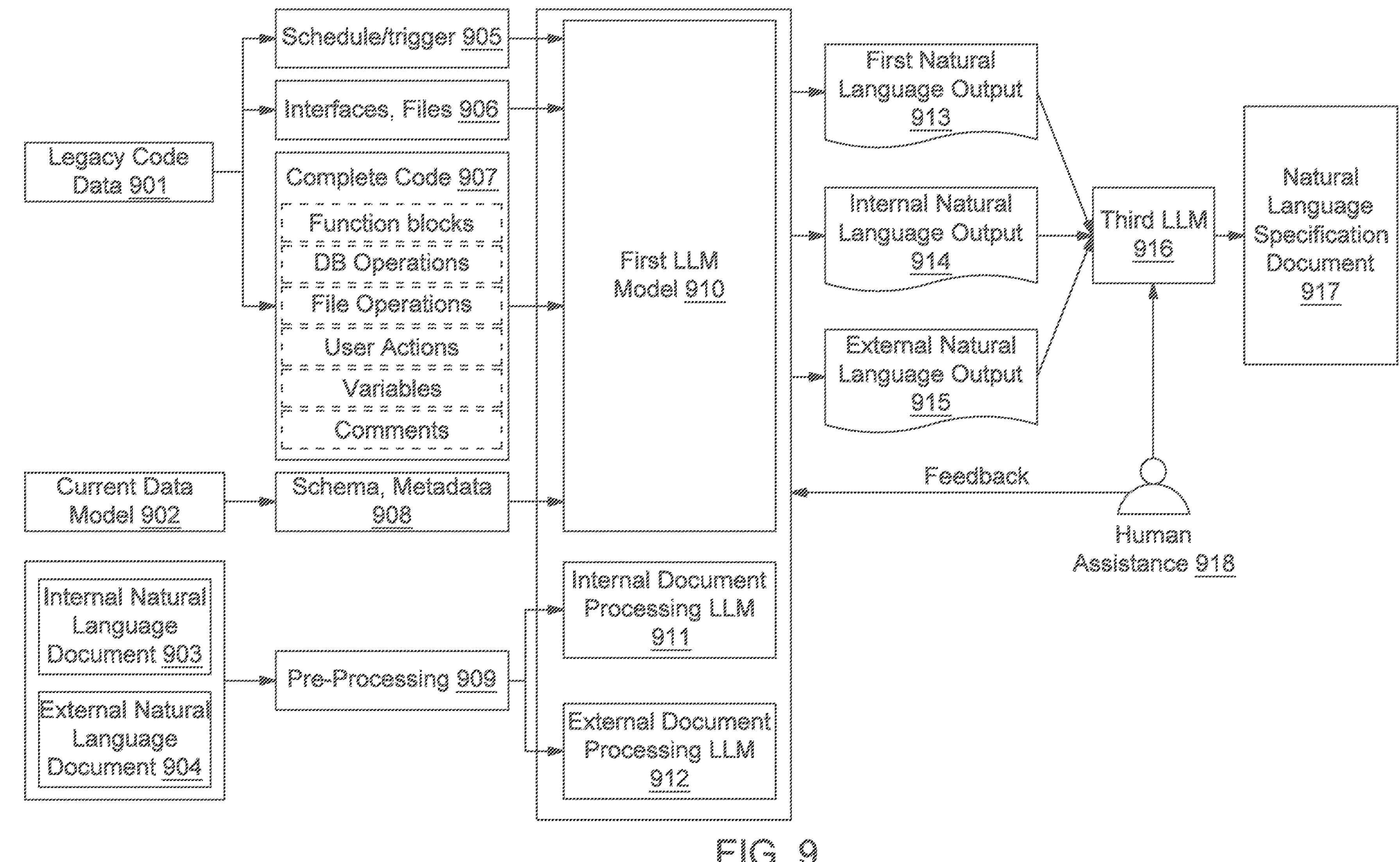
FIG. 9 is a diagram that illustrates generation of a natural language specification document corresponding to legacy code data, in accordance with an exemplary embodiment of the present disclosure.

FIG. 9 is a diagram that illustrates generation of a natural language specification document corresponding to legacy code data, in accordance with an exemplary embodiment of the present disclosure. FIG. 9 is explained in conjunction with elements from FIGS. 1, 2, 3, 4, 5, 6, 7, and 8. The natural language specification document may be obtained by extracting valuable information from various data sources that may include unstructured documents, human-generated documents, and industry reference documents. This information may then be compared with the knowledge extracted from the legacy codebase. Further a gap analysis may be performed to identify areas where the extracted knowledge may be lacking or incomplete. This gap analysis may be carried out by an AI model (such as, the third LLM), which may carefully examine the outputs and identifies the discrepancies. Based on gap analysis, the third LLM model may generate the natural language specification document.

In a more elaborative way, the process of generating the natural language specification document is explained via the present FIG. 9. The generation process may be divided into several key steps:

At initial step, a legacy code data 901, including complete code 907 such as programs copybooks, scripts, JCLs, etc., may undergo a multi-step transformation process using transformer-based generative AI models, (such as Code T5, GPT, or HuggingFace). These AI models is specifically trained on COBOL code to comprehend its structure and semantics. In this step, the entire legacy code data 901 may be fed into the transformer-based generative AI model (for example, a first LLM).

In addition to the legacy code data 901, the first LLM 910 may also receive input from a current data model 902, which includes schema and metadata 908. By incorporating the current data model 902, the first LLM 910 may gain a deeper understanding of existing data system, enhancing its transformation capabilities.

Besides the legacy code data 901 and current data model 902, the transformer-based generative AI models (such as, an internal document processing LLM 911 and an external natural language processing LLM 912) may also receive data from internal natural language documents 903 and external natural language documents 904. The internal natural language documents 903 may include various sources, such as standard operating procedures of the bank, life-cycle documents, internal knowledge repository, project-related documents, and incident reports. On the other hand, the external natural language documents 904 may include industry references such as the Banking Industry Architecture Network (BIAN) framework and regulatory or legal documents from external bodies.

Before inputting the legacy code data 901 into the first LLM 910, a pre-processing step may be performed to organize the code effectively. During this pre-processing, the legacy code data 901 may be segregated into schedule/trigger 905, interfaces, and file 906, and the complete code 907. The complete code 907 may further be classified into variables, file operations, SQL/DB operations, function blocks, user actions, and comments. This pre-processing step may prepare the legacy code for in-depth analysis and transformation, streamlining the subsequent stages of the process.

In an exemplary embodiment, the internal and external documents may also undergo pre-processing 909 before they are input to the internal and external document processing LLMs. The pre-processing of the internal and external documents may include several pre-processing steps, including indexing, crawling, and sentence vectorization.

The indexing step may include creating a structured representation of the documents, wherein unique identifiers may be assigned to each document, and essential information such as document titles, authors, dates, and keywords are extracted and stored in an index or database. This may facilitate efficient retrieval and access to specific documents based on their attributes.

The crawling step may include employing a software program, referred to as a web crawler or spider, to systematically navigate through websites or online sources. The web crawler may visit web pages, extracts relevant content, follows hyperlinks to other pages, and stores the acquired data for further processing. The crawling process may gather pertinent textual information from different repositories, databases, or websites.

The sentence vectorization step relates to an application of natural language processing (NLP) techniques. It may convert individual sentences from the internal and external documents into numerical representations (such as, vectors) suitable for ML models. Each word in a sentence may be converted into a numerical vector, and these word vectors may be combined to form a single vector representing the entire sentence. This representation may allow for effective processing of textual data by AI models (such as the internal document processing LLM 911 and the external document processing LLM 912).

Further, the first LLM 910 may generate a first natural language output 913 based on the legacy code data 901. The internal document processing LLM 911 may generate an internal natural language output 914 based on the internal natural language documents 903. The external document processing LLM 912 may generate an external natural language output 915, based on the external natural language documents 904.

Further, the first natural language output 913, the internal natural language output 914, and the external natural language output 915 may be fed as input to a third LLM 916. The third LLM 916 may fine-tune at least one of the first LLM 910, the internal document processing LLM 911, or the external document processing LLM 912. In fine-tuning process, the output (such as the first natural language output 913) of domain context from legacy code and knowledge extraction from documents (such as the internal natural language output 914, and the external natural language output 915) may be compared for gap analysis.

The gap analysis may be conducted to identify differences and variations between the information derived from the internal and external documents and the information gathered from the legacy codebase. The gap analysis outcome may be fed back into the generative AI models (such as the first LLM 910, the internal document processing LLM 911, or the external document processing LLM 912) as a feedback loop. This feedback loop may be an essential part of the iterative process that drives continuous improvement and refinement of the generative AI models. It should be noted that the feedback may be a human-assisted feedback 918. The feedback loop facilitates the modification of one or more parameters in the first LLM 910, the internal document processing LLM 911, or the external document processing LLM 912 based on the gaps identified during the analysis.

By incorporating this feedback into the LLMs, the generative AI model may learn from its errors and iteratively improve its performance. This continuous learning process may allow the LLM models to become more accurate and contextually relevant in generating the natural language outputs, ultimately resulting in a more comprehensive and precise natural language specification document.

Upon completing the fine-tuning process, the third LLM 916 may generate a natural language specification document 917 corresponding to the legacy code data 901 based on the first natural language output 913, the internal natural language output 914, or the external natural language output 915.

The natural language specification document 917 plays a vital role in modernizing the legacy codebase. This specification document may include various essential elements crucial for understanding and transforming the legacy code into a modernized code language. It includes detailed descriptions of entities, representing objects or concepts relevant to the domain being modeled, along with their associated attributes. Additionally, the natural language specification document 917 may outline various functions performed by the legacy code, the rules governing its behavior, and the events that trigger specific actions. Process flows may be laid out to describe the sequence of steps executed to achieve specific outcomes, and functional clusters may be employed to group related functions together based on similarity or purpose. Lastly, a bounded context may define the scope and context within which the legacy code operates. Collectively, these elements form a structured representation of the legacy codebase, facilitating its transformation and ensuring the modern code accurately reflects its functionalities and behaviors.

Figure 10:
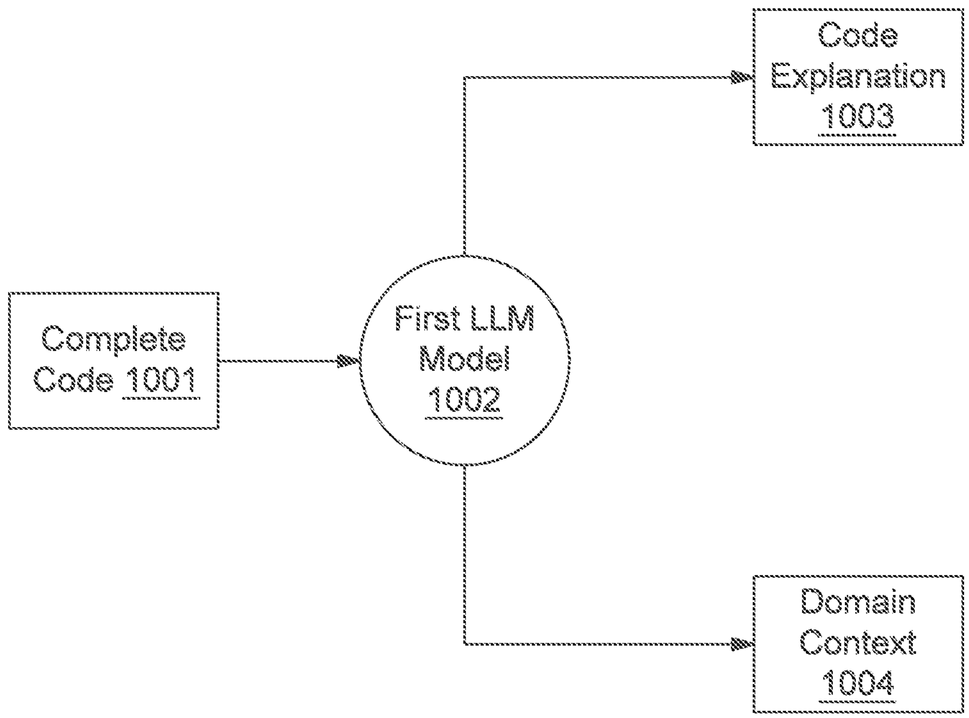
FIG. 10 a diagram that illustrates training of first LLM, in accordance with an exemplary embodiment of the present disclosure.

FIG. 10 is a diagram that illustrates training of first LLM (1002), in accordance with an exemplary embodiment of the present disclosure. FIG. 10 is explained in conjunction with elements from FIGS. 1, 2, 3, 4, 5, 6, 7, 8, and 9. The first LLM 1002 may be trained using a training dataset through a self-supervised learning technique. The training dataset may include a source code dataset (e.g., COBOL programs, copybooks, scripts, JCLs, etc.) and natural language specification (e.g., unstructured documents, human-generated documentations, industry references, SOPs, internal knowledge repository, project documents, application-specific documents, incident reports, etc.) corresponding to the source code dataset.

The training of the first LLM 1002 may include two approaches. The first approach may be to configure the first LLM 1002 to generate a code explanation 1003 in the first natural language output. For this purpose, the training dataset includes legacy code language information along with corresponding explanations. The second approach may be to configure the first LLM 1002 to generate a domain context 1004 in the first natural language output. In this case, the training dataset includes textual data.

To elaborate on the training process of the first LLM 1002, the complete pre-processed code 1001, including COBOL programs, COBOL copybooks, and related components, may be fed as input to a pre-trained sequence-to-sequence transformer-based generative model with an encoder-decoder architecture (i.e., the first LLM 1002). The first LLM 1002 may utilize a self-supervised learning techniques to further refine its understanding of the legacy code. During this training process, the first LLM 1002 may focus on expanding code functions and summarizing code comments, leading to a creation of a domain context and entities representation.

In the training of the first LLM 1002, various datasets such as 'The Pile', 'CodeSearchNet', 'CodeXGLUE', 'Concode', etc., which may include extensive source code and corresponding natural language descriptions may be utilized. One example of a pre-trained generative model may be a 'CodeT5' model, that may be accessible on 'HuggingFace' playground.

The approach may utilize the pre-trained generative model (e.g., CodeT5) with already possesses knowledge of programming languages. By employing unsupervised learning on a relatively larger dataset that includes over 1000 legacy code components, a foundational model may be created. This foundational model (i.e., the first LLM 1002) may be adapted in various manners. In this process, two adaptations may be created (one may be the code explanation 1003, and other may be the domain context 1004), resulting in three distinct outputs. Out of the three distinct outputs, two outputs may be obtained from the code explanation 1003 which may include a text document explaining code, and functionality and process flows across COBOL files using call dependency. One output from summarization of the domain context 1004 which may include text context. Based on these outputs, a Domain-Specific Language (DSL) specification document may be constructed.

Once the legacy code is understood and represented as the DSL specification document, the existing LLM models trained on the source code may be utilized to transform it into modernized programming languages such as Java or Python. This approach enables a seamless transformation of legacy code data into the modernized code language.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 11:
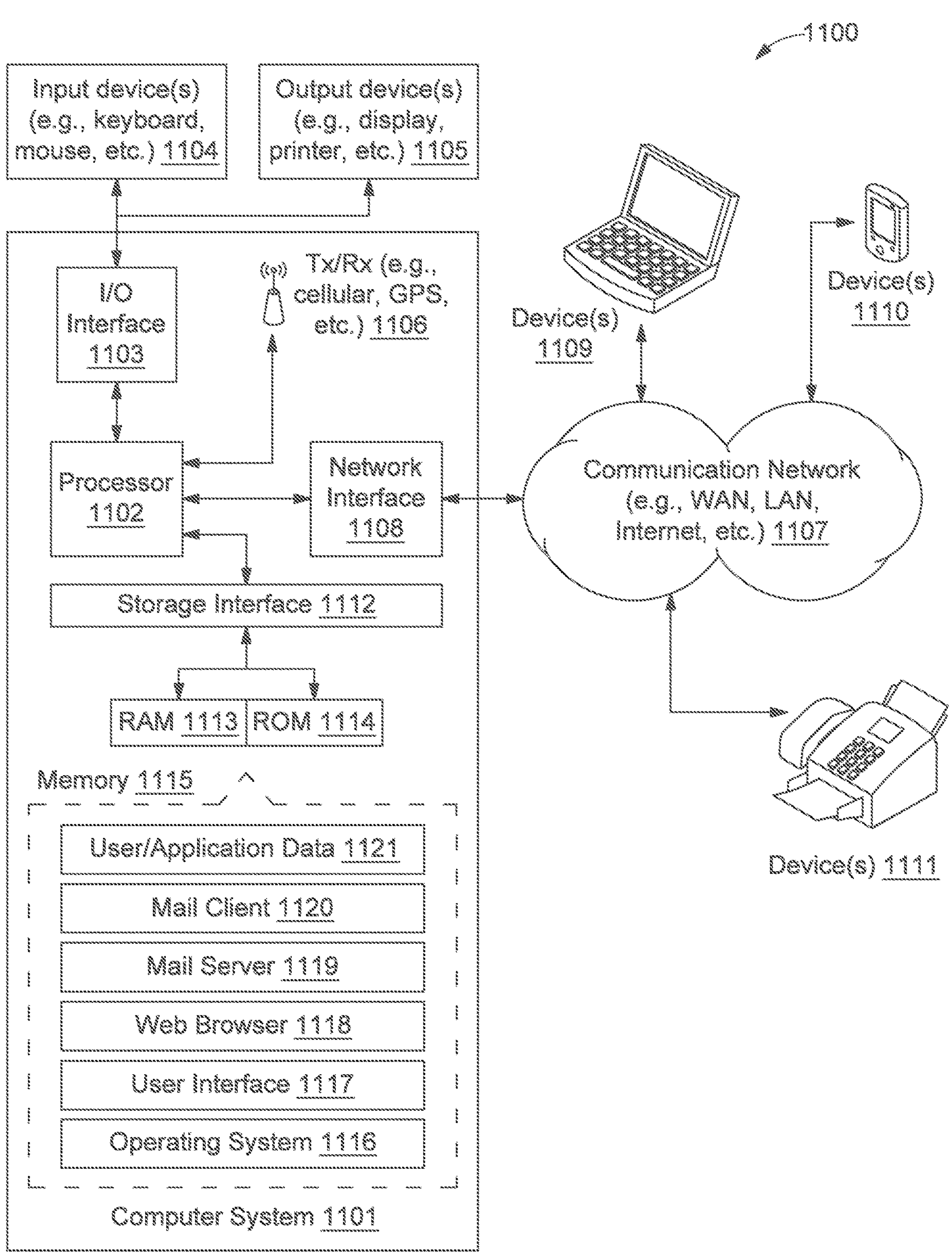
FIG. 11 is a block diagram that illustrates a system architecture of a computer system for facilitating legacy code transformation, in accordance with an exemplary embodiment of the present disclosure.

The disclosed methods and systems may be implemented on a conventional or a general-purpose computer system, such as a personal computer (PC) or server computer. FIG. 11 is a block diagram that illustrates a system architecture 1100 of a computer system 1101 for facilitating legacy code transformation, in accordance with an exemplary embodiment of the present disclosure. Variations of computer system 1101 may be used for implementing computing device 102 for facilitating legacy code transformation. Computer system 1101 may include a central processing unit ("CPU" or "processor") 1102. Processor 1102 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1102 may be disposed in communication with one or more input/output (I/O) devices via I/O interface 1103. The I/O interface 1103 may employ communication protocols/methods such as, without limitation, audio, analog, digital, monoaural, RCA, stereo, IEEE-1394, near field communication (NFC), Fire Wire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1103, the computer system 1101 may communicate with one or more I/O devices. For example, the input device 1104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1105 may be a printer, fax machine, video display (e.g., cathode ray tube (CRT), liquid crystal display (LCD), light-emitting diode (LED), plasma, or the like), audio speaker, etc. In some embodiments, a transceiver 1106 may be disposed in connection with the processor 1102. The transceiver 1106 may facilitate various types of wireless transmission or reception. For example, the transceiver 1106 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1102 may be disposed in communication with a communication network 1107 via a network interface 1108. The network interface 1108 may communicate with the communication network 1107. The network interface 1108 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1107 may include, without limitation, a direct interconnection, local area network (LAN), wide area network (WAN), wireless network (e.g., using Wireless Application Protocol), the Internet, etc. Using the network interface 1108 and the communication network 1107, the computer system 1101 may communicate with devices 1105, 1109, 1110, and 1111. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 1101 may itself embody one or more of these devices.

In some embodiments, the processor 1102 may be disposed in communication with one or more memory devices 1115 (e.g., RAM 1113, ROM 1114, etc.) via a storage interface 1112. The storage interface 1112 may connect to memory devices 1115 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, 12C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1115 may store a collection of program or database components, including, without limitation, an operating system 1116, user interface 1117, web browser 1118, mail server 1119, mail client 1120, user/application data 1121 (e.g., any data variables or data records discussed in this disclosure), etc. The operating system 1116 may facilitate resource management and operation of the computer system 1101. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 1117 may facilitate display, execution, interaction, manipulation, or operation of program components through textual or graphical facilities. For example, user interfaces may provide computer interaction interface elements on a display system operatively connected to the computer system 1101, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1101 may implement a web browser 1118 stored program component. The web browser 1118 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1101 may implement a mail server 1119 stored program component. The mail server 1119 may be an Internet mail server such as MICROSOFT® EXCHANGE®, or the like. The mail server 1119 may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server 1119 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1101 may implement a mail client 1120 stored program component. The mail client 1120 may be a mail viewing application, such as APPLE MAIL®, MICROSOFT ENTOURAGE®, MICROSOFT OUTLOOK®, MOZILLA THUNDERBIRD®, etc.

In some embodiments, computer system 1101 may store user/application data 1121, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of understanding and extracting information from complex legacy codebases, which have been a challenge for larger banks and financial institutions undergoing large-scale transformation programs. By employing generative AI models, such as the LLMs and code-generating AI models, this approach offers several significant advantages to financial services organizations. One of the key advantages is a substantial reduction in effort, timeline, and cost associated with reverse engineering legacy systems. With the ability to generate natural language outputs and domain context from the legacy code data and various natural language documents, the manual effort required for deciphering complex legacy code and documentation is greatly minimized. This leads to a streamlined and efficient transformation process, enabling organizations to accelerate their modernization initiatives.

Another notable advantage is the reduced dependency on legacy skills and the avoidance of vendor lock-in with legacy platforms. Traditional methods of understanding legacy code often rely heavily on specific skills and expertise in outdated programming languages like COBOL. By utilizing generative AI models, this solution allows organizations to shift away from legacy skill dependencies, providing a more flexible and future-proof approach to legacy modernization.

Moreover, the disclosed techniques assist in planning business capabilities to be delivered incrementally within large-scale transformation programs. By generating natural language specification documents and domain models, financial services organizations may gain a comprehensive understanding of their legacy codebase, enabling better planning and prioritization of modernization efforts. This incremental delivery approach helps in avoiding disruptions and facilitates a smooth and systematic transition to modernized systems.

Additionally, the expedited time-to-market provided by the disclosed techniques is a significant benefit. The use of generative AI models allows for faster and more accurate comprehension of legacy code and documents, leading to quicker decision-making and code modernization. As a result, financial institutions may speed up their digital transformation initiatives, enhancing their competitive edge and responsiveness to rapidly changing market demands.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for facilitating legacy code transformation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for facilitating legacy code transformation, the method comprising:

receiving, by a computing device, legacy code data and at least one natural language document from one or more data sources;

generating, by the computing device, a first natural language output based on the legacy code data through a first Large Language Model (LLM), and a second natural language output based on the at least one natural language document through a second LLM, wherein the first natural language output comprises domain context or code explanation corresponding to the legacy code data, and wherein the second natural language output comprises extracted knowledge from the at least one natural language document;

fine-tuning, by the computing device, at least one of the first LLM or the second LLM based on the first natural language output and the second natural language output, through a third LLM, wherein the third LLM is configured to identify one or more gaps between the first natural language output and the second natural language output; and generating, by the computing device, a natural language specification document corresponding to the legacy code data based on the first natural language output and the second natural language output through the third LLM.

2. The method of claim 1, wherein each of the first LLM, the second LLM, and the third LLM is an encoder-decoder transformer architecture-based generative Artificial Intelligence (AI) model.

3. The method of claim 1, further comprising training, by the computing device, the first LLM using a training dataset through a self-supervised learning technique, wherein the training dataset comprises a source code dataset and natural language specification corresponding to the source code dataset.

4. The method of claim 3, wherein training the first LLM comprises, at least one of:

configuring, by the computing device, the first LLM to generate the code explanation corresponding to the legacy code data in the first natural language output, wherein the training dataset comprises legacy code language information and corresponding explanation; or configuring, by the computing device, the first LLM to generate the domain context in the first natural language output, wherein the training dataset comprises textual data.

5. The method of claim 1, further comprising pre-processing, by the computing device, the legacy code data and the at least one natural language document.

6. The method of claim 1, wherein generating the first natural language output based on the legacy code data further comprises, at least one of:

generating, by the computing device, expanded code functions corresponding to the legacy code data in natural language, wherein the first natural language output comprises the expanded code functions; or generating, by the computing device, summaries of code comments in the legacy code data in natural language, wherein the first natural language output comprises the summaries.

7. The method of claim 1, wherein fine-tuning at least one of the first LLM and the second LLM further comprises:

providing, by the computing device and via the third LLM, a feedback to at least one of the first LLM or the second LLM based on the identified one or more gaps; and modifying, by the computing device, one or more parameters of the at least one of the first LLM or the second LLM based on the feedback.

8. The method of claim 1, wherein the fine-tuning is based on human-assisted feedback corresponding to the first natural language output and the second natural language output.

9. The method of claim 1, further comprising generating, by the computing device, a Domain-Specific Language (DSL) specification document based on the first natural language output and the second natural language output through the third LLM.

10. The method of claim 1, further comprising generating modern code data corresponding to the legacy code data based on the natural language specification document through a code-generating generative AI model, wherein the modern code data is a transformation of the legacy code data in a modernized code language.

11. The method of claim 1, wherein each of the one or more data sources is one of an external data source or an internal data source.

12. A system for facilitating legacy code transformation, the system comprising:

a processing circuitry; and a memory communicatively coupled to the processing circuitry, wherein the memory stores processor instructions, which when executed by the processing circuitry, cause the processing circuitry to:

receive legacy code data and at least one natural language document from one or more data sources;

generate a first natural language output based on the legacy code data through a first Large Language Model (LLM), and a second natural language output based on the at least one natural language document through a second LLM, wherein the first natural language output comprises domain context or code explanation corresponding to the legacy code data, and wherein the second natural language output comprises extracted knowledge from the at least one natural language document;

fine-tune at least one of the first LLM or the second LLM based on the first natural language output and the second natural language output, through a third LLM, wherein the third LLM is configured to identify one or more gaps between the first natural language output and the second natural language output; and generate a natural language specification document corresponding to the legacy code data based on the first natural language output and the second natural language output through the third LLM.

13. The system of claim 12, wherein, each of the first LLM, the second LLM, and the third LLM is an encoder-decoder transformer architecture-based generative Artificial Intelligence (AI) model.

14. The system of claim 12, wherein the processor instructions, on execution, further cause the processing circuitry to train the first LLM using a training dataset through a self-supervised learning technique, and wherein the training dataset comprises a source code dataset and natural language specification corresponding to the source code dataset.

15. The system of claim 14, wherein to train the first LLM, the processor instructions, on execution, further cause the processing circuitry to, at least one of:

configure the first LLM to generate the code explanation corresponding to the legacy code data in the first natural language output, wherein the training dataset comprises legacy code language information and corresponding explanation; or configure the first LLM to generate the domain context in the first natural language output, wherein the training dataset comprises textual data.

16. The system of claim 12, wherein the processor instructions, on execution, further cause the processing circuitry to pre-process the legacy code data and the at least one natural language document.

17. The system of claim 12, wherein to generate the first natural language output based on the legacy code data the processor instructions, on execution, further cause the processing circuitry to, at least one of:

generate expanded code functions corresponding to the legacy code data in natural language, wherein the first natural language output comprises the expanded code functions; or generate summaries of code comments in the legacy code data in natural language, wherein the first natural language output comprises the summaries.

18. The system of claim 12, wherein to fine-tune at least one of the first LLM and the second LLM the processor instructions, on execution, further cause the processing circuitry to:

provide, via the third LLM, a feedback to at least one of the first LLM or the second LLM based on the identified one or more gaps; and modify one or more parameters of the at least one of the first LLM or the second LLM based on the feedback.

19. The system of claim 12, wherein the processor instructions, on execution, further cause the processing circuitry to generate modern code data corresponding to the legacy code data based on the natural language specification document through a code-generating generative AI model, wherein the modern code data is a transformation of the legacy code data in a modernized code language.

* * * * *